United States Patent [19]
Miyamoto

[11] Patent Number: 5,947,173
[45] Date of Patent: Sep. 7, 1999

[54] CUTTING APPARATUS FOR WOOD OR THE LIKE

[75] Inventor: Kouichi Miyamoto, Fuchu, Japan

[73] Assignee: Ryobi Limited, Japan

[21] Appl. No.: 09/030,056

[22] Filed: Feb. 24, 1998

[30] Foreign Application Priority Data

| Feb. 24, 1997 | [JP] | Japan | 9-039410 |
| Feb. 27, 1997 | [JP] | Japan | 9-043876 |
| Feb. 28, 1997 | [JP] | Japan | 9-045894 |
| May 23, 1997 | [JP] | Japan | 9-133533 |

[51] Int. Cl.[6] .................. B27C 5/00; B27C 1/20
[52] U.S. Cl. .................. 144/136.1; 83/435.11; 83/471.3; 83/473; 83/581; 83/875; 83/522.16; 144/136.95; 144/137; 144/371; 144/82; 409/137; 409/180; 409/219
[58] Field of Search .................. 144/136.1, 136.95, 144/137, 82, 84, 371; 409/137, 162, 181, 182, 219, 180, 227, 228; 83/435.11, 471.3, 473, 522.16, 522.17, 581, 875; 30/505

[56] References Cited

U.S. PATENT DOCUMENTS

| 4,909,680 | 3/1990 | Wolff | 144/136.95 |
| 4,934,422 | 6/1990 | Hempy et al. | 144/136.95 |

*Primary Examiner*—W. Donald Bray
*Attorney, Agent, or Firm*—Brooks & Kushman P.C

[57] ABSTRACT

A cutting apparatus that performs cutting operations without being held by an operator and that is applicable to various cutting operations in addition to forming a biscuit groove. The cutting apparatus comprises a first base portion having a mount surface on which a work is mounted; a second base portion having an abutment surface with which a work surface to be worked is brought into contact; and a cutter holding portion capable of holding a circular saw blade so as to extend beyond the abutment surface toward the work. The cutter holding portion is turnable, with respect to the second base portion, around an axis perpendicular to the abutment surface.

15 Claims, 16 Drawing Sheets

CUTTING APPARATUS FOR WOOD OR THE LIKE

BACKGROUND OF THE INVENTION

This invention relates to a cutting apparatus for cutting a groove, such as a biscuit groove, on wood or the like.

As a method for connecting a pair of wood plates to each other, there has been known a method which comprises the steps of forming a semicircular groove so called a "biscuit groove" on each of the contacting surfaces of the wood plates, applying an adhesive agent to both grooves of the wood plates and inserting a connecting disc plate, a so-called biscuit," in both grooves thereof. With respect to an apparatus for forming such a biscuit groove, a hand-held apparatus for forming a semicircular groove in wood by the rotation of a disc-shaped cutter is disclosed, for example, in Japanese Patent Publication No. H6-26801.

However, the conventional groove forming apparatus described above permits the formation of only a specific biscuit groove having the curvature corresponding to the diameter of the cutter, resulting in a low degree of work freedom. When the depth of cut is increased, for example, the length of the groove is also increased accordingly, thus making it substantially impossible to form a deep groove. The change in shape of the groove always requires the time-consuming of the cutter, thus reducing the working efficiency. The groove forming apparatus has a large front end portion with which the disc-shaped cutter should be covered, thus causing the entire apparatus to be heavy, with the result that a heavy burden is imposed on an operator who handles the groove forming apparatus.

SUMMARY OF THE INVENTION

One of the objects of the present invention is to provide a cutting apparatus which can carry out a cutting operation without being held by an operator and which can be applied to various cutting operations besides forming a biscuit groove.

In order to attain the above object, a cutting apparatus for cutting a work, such as wood, comprises a first base portion having a mounting surface on which the work is mounted; a second base portion having an abutment surface with which a work surface to be worked is brought into contact; and a cutter holding portion capable of holding a circular saw blade so as to extend through the abutment surface, the cutter holding portion being turnable, with respect to the second base portion, around an axis perpendicular to the abutment surface.

According to the above cutting apparatus, since the apparatus is provided with the first base portion for supporting the work, it is possible to carry out cutting operation with the apparatus being installed on the floor or the like. Thus, it is possible to carry out the cutting operation stably in comparison with a conventional hand-held apparatus. It is also possible to carry out various cutting operations besides forming the biscuit groove by turning the circular saw blade to change the relationship between the circular saw blade and the work.

In the above cutting apparatus, the cutter holding portion may be turned between a vertical position at which the circular saw blade is held vertically and a horizontal position at which the circular saw blade is held horizontally.

It may be possible to add a guide member extending in a direction perpendicular to the abutment surface, and the second base portion may be mounted on the guide member so as to be slidable along the guide member. In this case, the apparatus can further comprise a support frame coupled with the guide member, and the cutter holding portion can have a turn table mounted on the support frame so as to be turnable around the axis perpendicular to the abutment surface. Also, the apparatus further comprises a fixing device for preventing slide movement of the second base portion with respect to the guide member. The first base portion may be coupled with the second base portion so as to be movable in a direction parallel to the abutment surface.

It may be possible that the cutter holding portion has a turn table mounted on the second base portion so as to be turnable around the axis perpendicular to the abutment surface. In this case, the turn table can be provided with a first guide member extending in a direction perpendicular to the abutment surface, and the cutter holding portion can have a slide base mounted on the first guide member so as to be slidable along the first guide member. The apparatus can further comprise a fixing device for preventing slide movement of the slide base with respect to the first guide member. The apparatus can further comprise a second guide member extending in a direction parallel to the abutment surface, and the second base portion can be mounted on the second guide member so as to be slidable along the second guide member.

The apparatus can be provided with a pair of rulers mounted on the mount surface of the first base portion so as to be movable on the mount surface to adjust position and angle relative to the abutment surface. A set gauge for locating the pair of rulers symmetrically to a plane parallel to a direction along which the circular saw blade is cut into the work can be mounted on the mount surface of the first base portion.

The apparatus can further comprise a kickback prevention device having a main body mounted on the mount surface of the first base portion, a press member provided between the main body and the mount surface, at least two link members, each of which is pivotally connected with both of the main body and the press member to regulate a moving direction of the press member with respect to the main body, and an urging member for urging the press member toward the second base portion.

In another preferred aspect of the present invention, there is provided a cutting apparatus for cutting a work, such as wood, comprising a cutter holding portion for holding a cutter blade; a frame holding the cutter holding portion; a guide member attached to the frame and extending in a direction along which the cutter blade cuts the work; and a work holding device capable of holding the work and being movable along the guide member.

In a further preferred aspect of the present invention, there is provided a cutting apparatus for cutting a work, such as woods comprising: a first base portion on which the work is mounted; a second base portion having an abutment surface with which a work surface to be worked is brought into contact; a base operating device capable of moving the second base portion along a direction parallel to the abutment surface; a cutter holding portion supported by the second base portion and holding a cutter blade so as to extend through the abutment surface; and a cutter driving device for rotating the cutter blade about an axis thereof.

Still further objects, features and other aspect of the present invention will be understood from the following detailed description of the preferred embodiments of the present invention with reference to the accompanying drawings.

DESCRIPTION OF THE PREFERRED EMBODIMENTS

Figure 1:
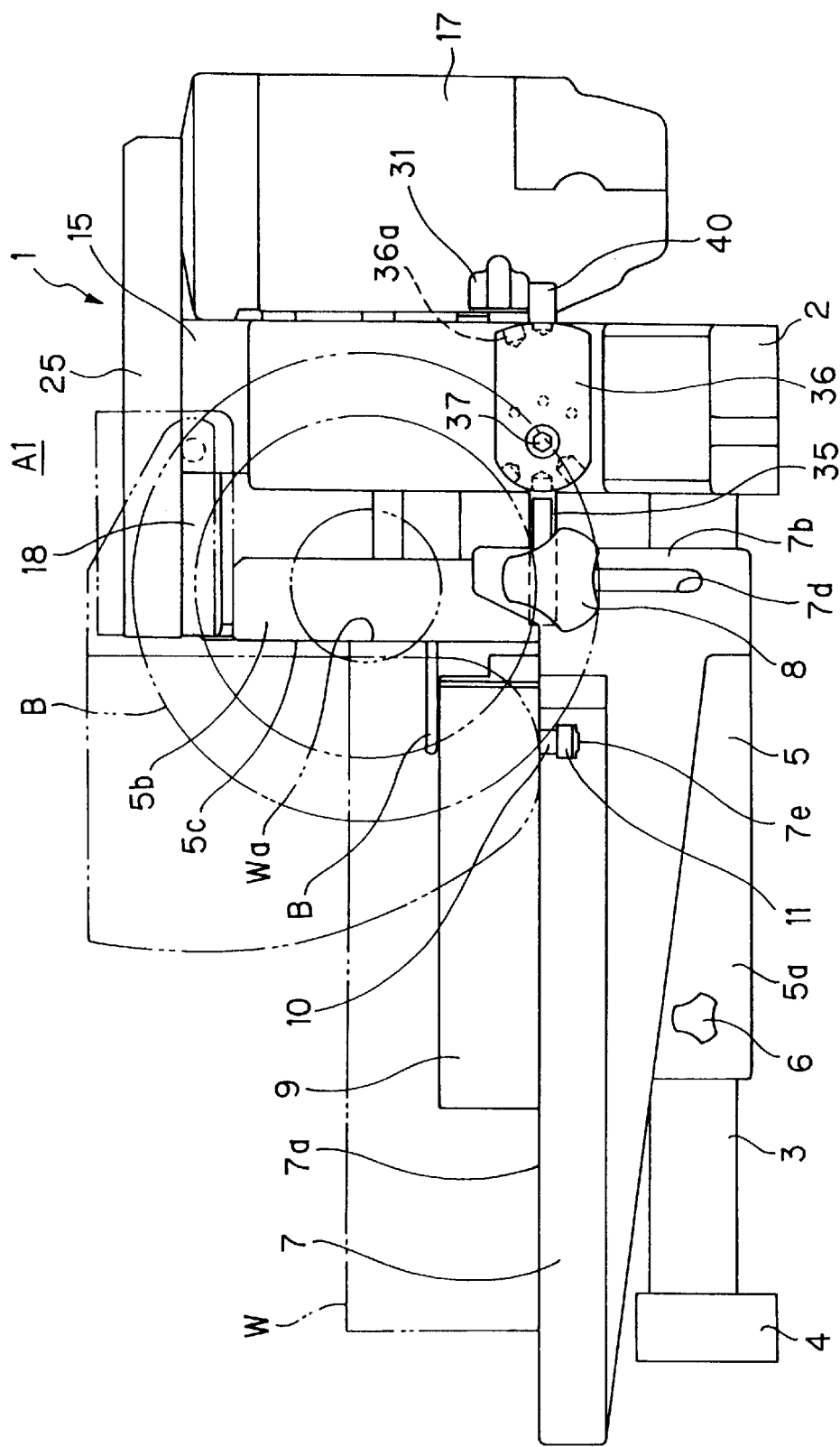
FIG. 1 is a side view illustrating a cutting apparatus to which the present invention is applied.

Now, the first embodiment of the present invention will be described hereunder with reference to the accompanying drawings.

FIGS. 1 to 4 show a cutting apparatus A1 to which the present invention is applied. In the following explanation, the right-and-left direction of FIG. 1 corresponds to the cross direction of the apparatus A1, the vertical direction of FIG. 1 corresponds to the vertical direction of the apparatus A1, and the vertical direction of FIG. 2 corresponds to the lateral direction of the apparatus A1. The left hand side of FIG. 1 corresponds to the front side of the apparatus A1.

As shown in these figures, the apparatus A1 comprises a support frame 2 on which a cutter portion 1 as a cutter holding portion is provided. At the lower portion of the support frame 2 is provided a pair of guide bars 3, 3 as guide members protruding toward the front side of the apparatus A1, and a stand 4 is attached to the front ends of the guide bars 3, 3. The apparatus A1 is installed horizontally with the lower surfaces of the support frame 2 and the stand 4 being brought into contact with a floor or the like.

A guide portion 5a of a vertical base 5 as a second base portion is slidably mounted on the guide bars 3, 3, one end of the guide portion 5a is provided with a vertical wall portion 5b extending in the vertical direction of the apparatus A1, and an abutment surface 5c with which a surface Wa of a work W to be worked is brought into contact is formed on the front side of the vertical wall portion 5b. A knob bolt 6 as a fixing device is screwed into a side surface portion of the guide portion 5a. The vertical base 5 can be fixed at a desired position on the guide bars 3, 3 by turning the knob bolt 6 and pressing the front end portion of the bolt 6 against the guide bar 3.

Above the guide portion 5a is provided a horizontal base 7 as a first base portion. The upper surface of the horizontal base 7 is constructed as a mount surface 7a on which the work W is mounted. The horizontal base 7 is provided at its rear end with a guide portion 7b, and the vertical wall portion 5b of the vertical base 5 is fitted into a groove 7c of the guide portion 7b to thereby allow the horizontal base 7 to be moved up and down. The guide portion 7b is provided on its side surface with an elongated hole 7d through which a knob bolt 8 is screwed into the vertical base 5. The horizontal base 7 can be fixed at a desired position in the vertical direction by turning the knob bolt 8. In the apparatus A1, the combination of the vertical base 5 and the horizontal base operate as a work holding device.

Figure 2:
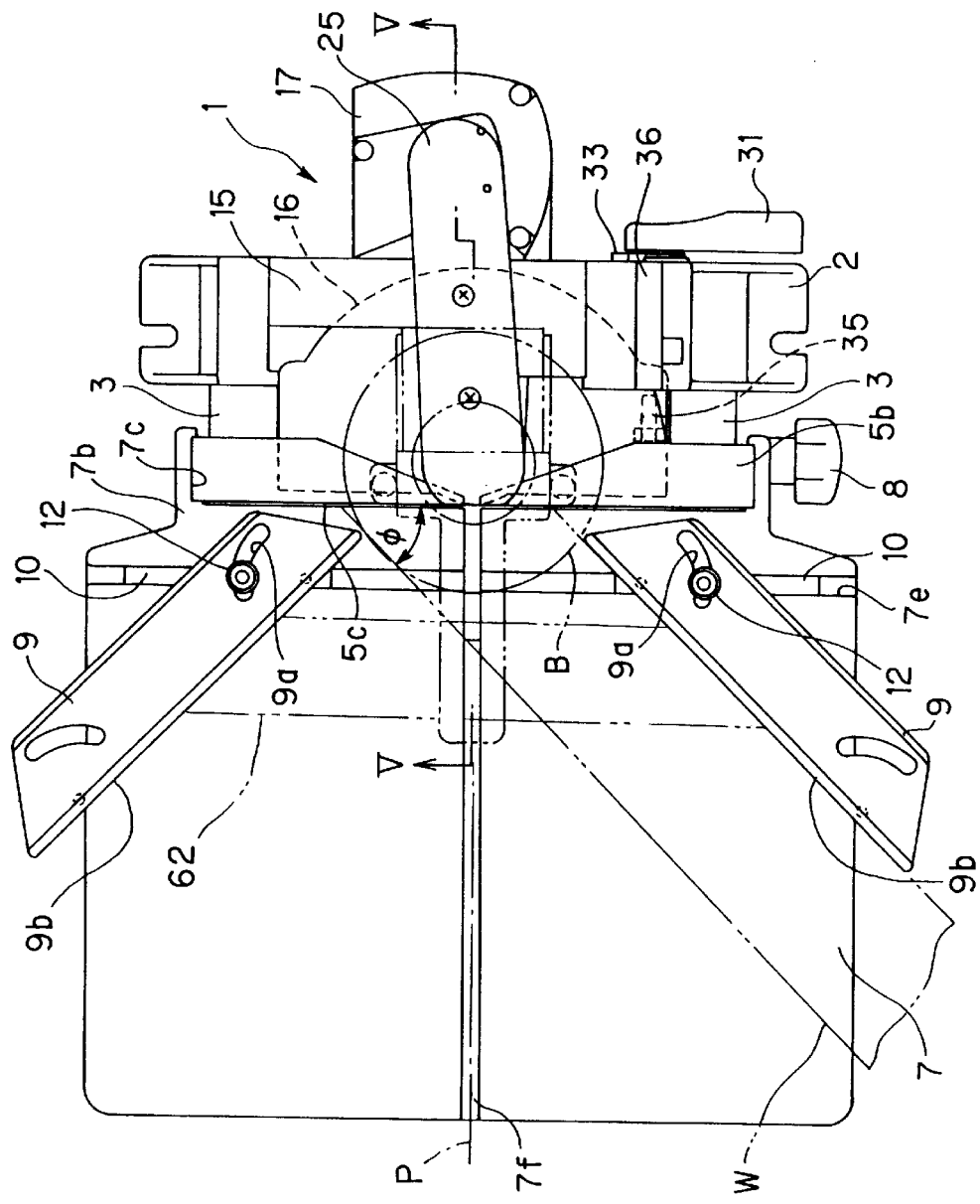
FIG. 2 is a plan view of the cutting apparatus as shown in FIG. 1.

As shown in FIGS. 1 and 2, the mount surface 7a of the horizontal base 7 is provided with a groove 7e parallel to the abutment surface 5c of the vertical base 5 and with a groove 7f perpendicular to the abutment surface 5c thereof. A pair of angle rulers 9, 9 are provided on the mount surface 7a. Also, a pair of guides 10, 10 and a pair of nuts 11, 11 are inserted into the groove 7e so as to correspond to the angle rulers 9, 9. Each ruler 9 has arch-shaped elongated holes 9a, 9a into which bolts 12, 12 can be inserted. Each bolt 12 is screwed into the nut 11 through the guide 10 to fix the angle ruler 9 at a desired position on the horizontal base 7.

The groove 7e has two portions, the width of the lower portion of which is wider than that of the upper portion thereof, and the width of the upper portion is set at a value substantially equal to the width of the guide 10. The nut 11 is formed into a rectangular shape when it is observed in a direction along which the bolt 12 is screwed. The length of the long side of the nut 11 is substantially equal to the width of the lower portion of the groove 7e, and the length of the short side thereof is substantially equal to the width of the guide 10. Therefore, the angle ruler 9 can be fixed at a desired position on the mount surface 7a when the nut 11 is so arranged that the long side thereof is perpendicular to the longitudinal direction of the groove 7e, and the angle ruler 7 can be moved along the groove 7e when the nut 11 is so arranged that the long side thereof is parallel to the longitudinal direction of the groove 7e. The figure and the dimension of the groove 7f are equal to those of the groove 7e.

Figure 5:
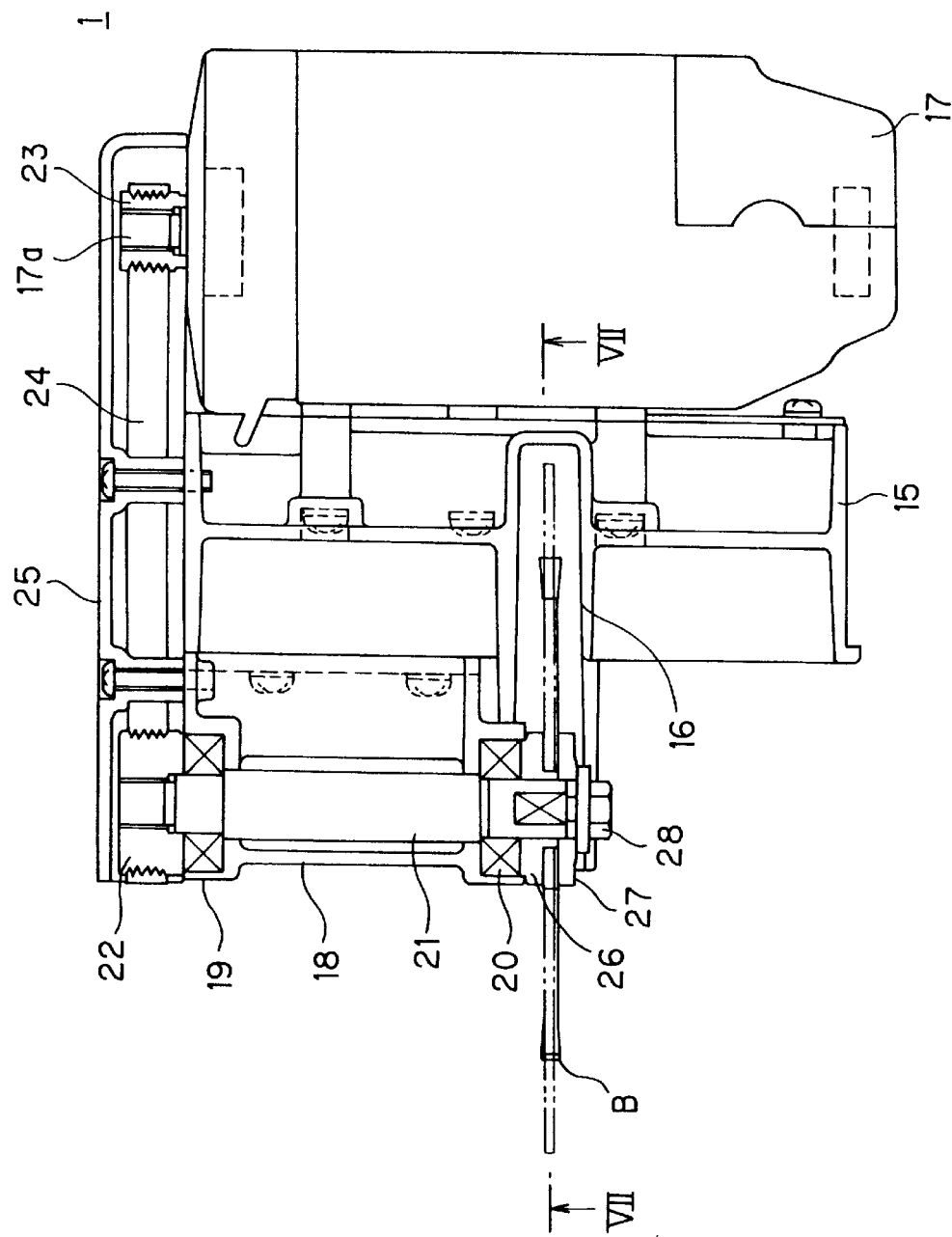
FIG. 5 is a sectional view of the cutting apparatus along the line V—V in FIG. 2.
Figure 6:
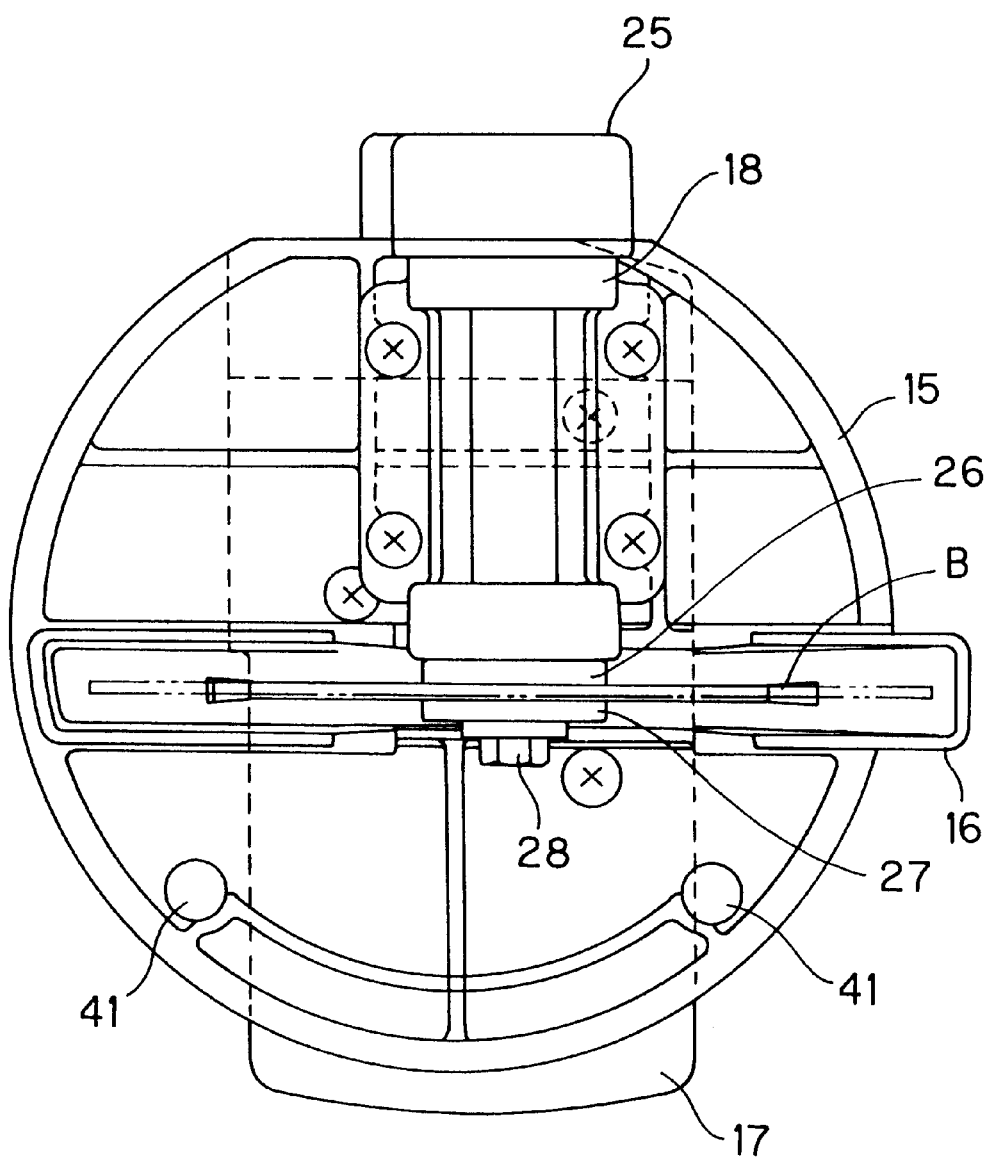
FIG. 6 is a front view of a cutter portion of the cutting apparatus as shown in FIG. 1.
Figure 7:
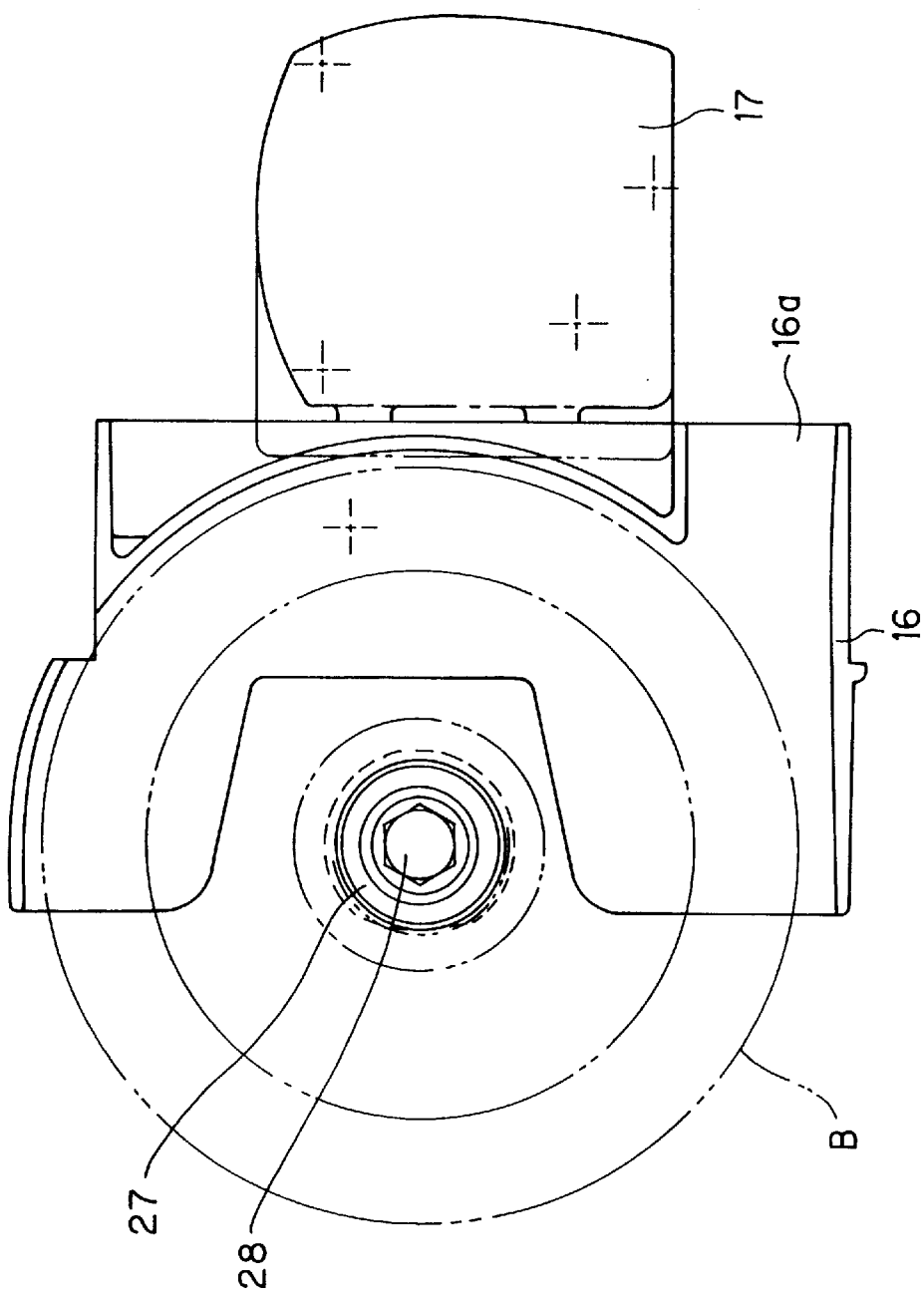
FIG. 7 is a sectional view of the cutter portion along the line VII—VII in FIG. 5.

FIGS. 5 to 7 show a detail of the cutter portion 1. As is obvious from these figures, the cutter portion 1 is provided with a turn table 15. The turn table 15 is integrally formed with a cutter cover 16 having a chip outlet 16a for discharging chips. The cutter cover 16 is formed so as to cover half of the circular saw blade B.

At the rear end portion and the front end portion of the turn table 15, there are provided a motor 17 and a bearing case 18, respectively. In the bearing case 18, a cutter shaft 21 is mounted through bearings 19, 20 so as to be rotatable about its axis. At one end of the cutter shaft 21 is provided a big pulley 22. A small pulley 23 is secured to a motor shaft 17a, and a belt 24 is stretched between both pulleys 22, 23 to transmit the rotation from the motor 17 to the cutter shaft 21. The belt 24 is covered with a belt cover 25.

The cutter shaft 21 is provided at its end portion with a pair of upper and lower flanges 26, 27, each of which 27 is retained in position by a fastening bolt 28. The lower flange 27 can be pulled out from the cutter shaft 21 by detaching the fastening bolt 28 to thereby attach the circular saw blade B to the cutter shaft 21. The blade B can be held between both flanges 26, 27 by the steps of attaching the circular saw blade B to the lower side of the upper flange 27 while the lower flange 27 is pulled out, mounting the lower flange 26 on the cutter shaft 21, and screwing the fastening bolt 28 into the cutter shaft 21.

As shown in FIGS. 1 to 4, the turn table 15 is supported by the support frame 2 so as to be rotatable about an axis extending in the cross direction of the apparatus A1.

Figure 4:
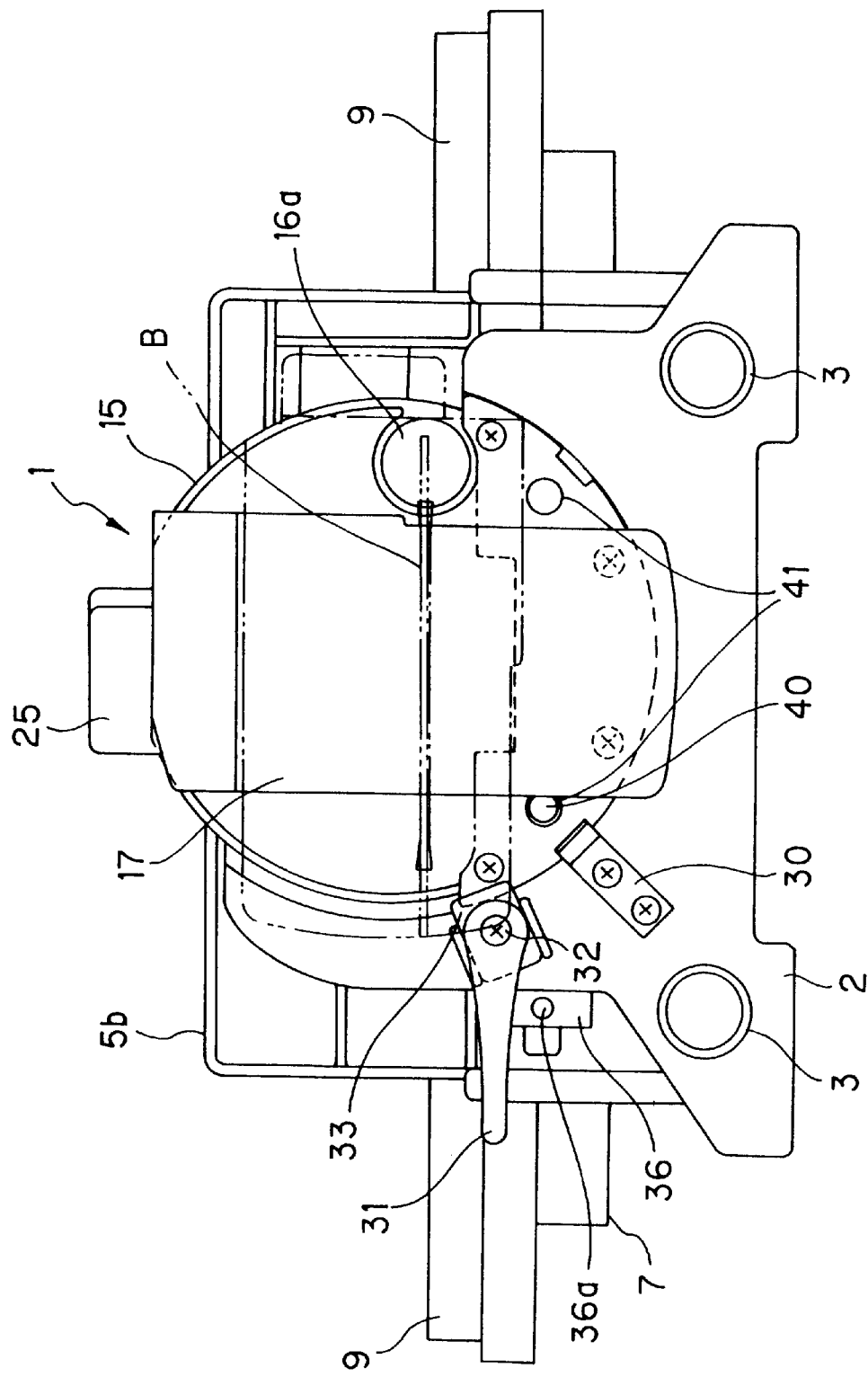
FIG. 4 is a rear view of the cutting apparatus as shown in FIG. 1.

Referring to FIG. 4, a stopper 30 is attached to the rear surface of the support frame 2 and is brought into contact with the turn table 15 to prevent the table 15 from being pulled out from the support frame 2. Above the stopper 30 is provided a clamp lever 31 which is manually swingable with a screw 32 as a fulcrum, and a clamp plate 33 is interposed between the clamp lever 31 and the turn table 15. The clamp plate 33 is pressed against the turn table 15 to restrict turning of the table 15 by operating the clamp lever 31 so as to fasten the screw 32.

As shown in FIG. 1, a stopper bolt 35 protruding toward the rear of the apparatus A1 is attached to the vertical wall portion 5b of the vertical base 5 so as to be operable to adjust the length of protrusion from the base 5. A cutting stopper 36 corresponding to the stopper bolt 35 is attached to the support frame 2 so as to be turnable about a pivot shaft 37. The cutting stopper 36 is held by a click mechanism (not shown in the figures) under the condition that one of five stopper holes 36a . . . 36a, each of which is formed on the outer circumference of the stopper 36 and has a different depth, or the outer surface between the holes 36a is located at a position facing the stopper bolt 35. The stopper bolt 35 and the cutting stopper 36 contact each other as the vertical base 5 moves rearward, and then further rearward movement of the vertical base 5 is prevented. Therefore, it is possible to change the maximum depth of cut by the circular saw blade B with respect to the work W by adjusting at least one of the extension of the stopper bolt 35 and the relative angular disposition of the cutting stopper 36.

Figure 3:
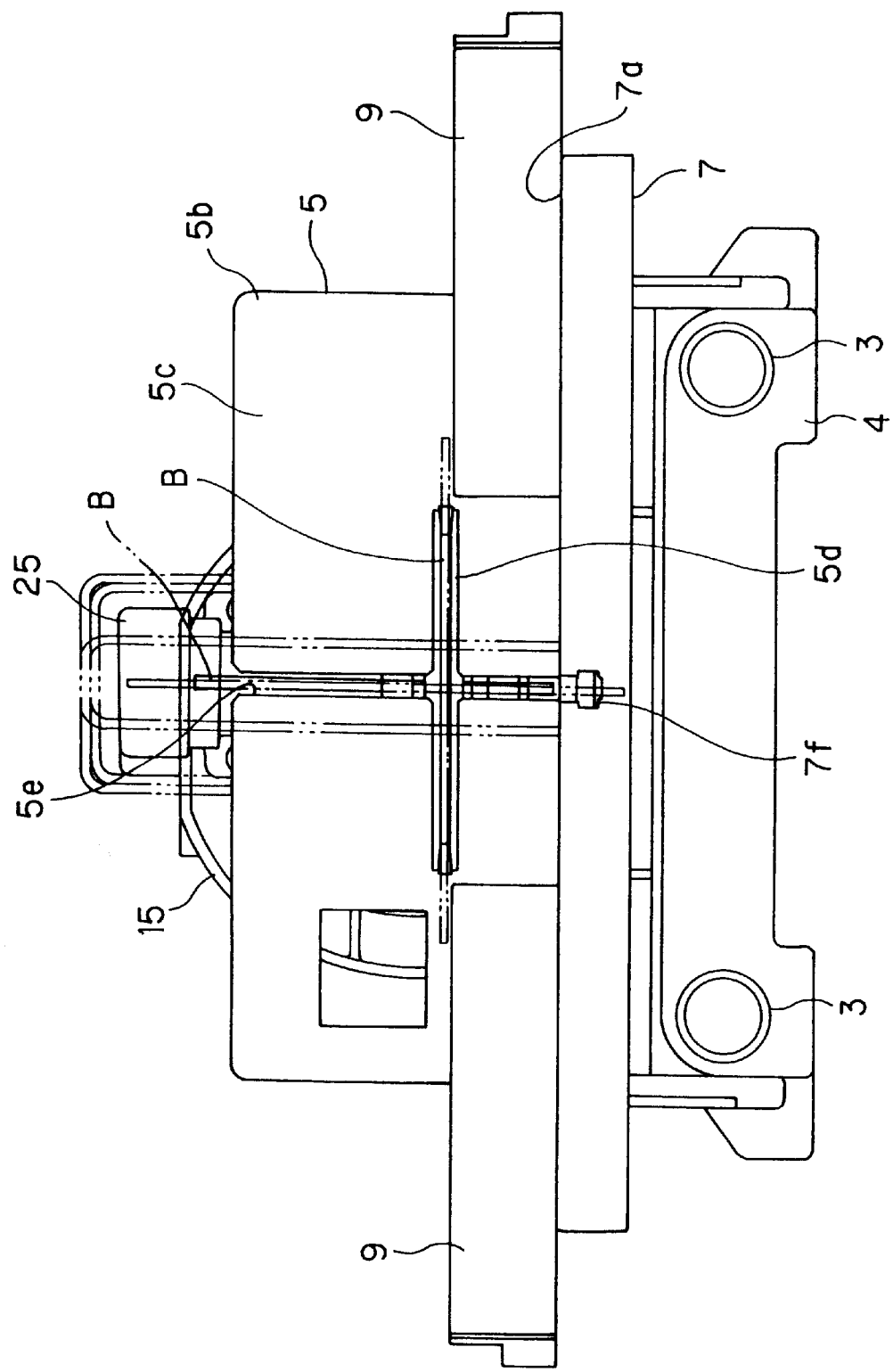
FIG. 3 is a front view of the cutting apparatus as shown in FIG. 1.

As shown in FIGS. 1 and 4, the vertical base 5 is provided with a locating bar 40 which protrudes toward the rear of the apparatus A1. The turn table 15 is provided with a pair of locating holes 41, 41, each of which has a diameter slightly larger than that of the locating bar 40. The locating bar 40 is located coaxially with one of the locating holes 41 when the circular saw blade B is held horizontally or vertically in accordance with the turning movement of the turn table 15. Under this condition, the locating bar 40 can be inserted into the locating hole 41 as the vertical base 5 moves toward the support frame 2, thereby allowing the movement of the vertical base 5 in the cross direction of the apparatus A1. When the circular saw blade B is not horizontal or vertical, the locating bar 40 contacts the front surface of the turn table 15, so that the rearward movement of the vertical base 5 is prevented. As shown in FIG. 3, the vertical wall portion 5b of the vertical base 5 is formed with grooves 5d, 5e to allow the circular saw blade B, which is held horizontally or vertically, to project from the abutment surface 5c toward the front side of the apparatus A1.

A method of cutting with the above apparatus A1 is as follows. First, the turn table 15 is operated to locate the circular saw blade B horizontally or vertically, then the clamp lever 31 is operated to prevent the turning of the turn table 15. At this time, the stopper bolt 35 and the cutting stopper 36 are operated to adjust the depth of cut if necessary. Next, the work W is mounted on the mount surface 7a of the horizontal base 7, and the surface Wa thereof is pressed against the abutment surface 5c of the vertical base 5. At this time, the height of the horizontal base 7 and the position of the angle ruler 9 are adjusted if necessary. After finishing the above arrangement, the circular saw blade B is driven by the motor 17 and the vertical base 5 is moved toward the support frame 2 along the guide bars 3, 3. Therefore, the semicircular biscuit groove is formed in the work W by the circular saw blade B. When the circular saw blade B is laid horizontally and the work W is moved in the lateral direction of the apparatus A1 along the abutment surface 5c, an elongated groove is formed on the work W. Also, if the circular saw blade B is held vertically, it is possible to cut off the work W.

In this embodiment, it is possible to change the number of the guide bars 3 to one or more than two. The cutter portion 1 is not restricted to one capable of turning with respect to the support frame 2. It is possible to move the cutter portion 1 up and down, instead of the horizontal base 7.

As shown in FIG. 2 with imaginary lines, the angle rulers 9, 9 can be set with a set gauge 62 to adjust their angles with respect to the abutment surface 5c of the vertical base 5.

Figure 8:
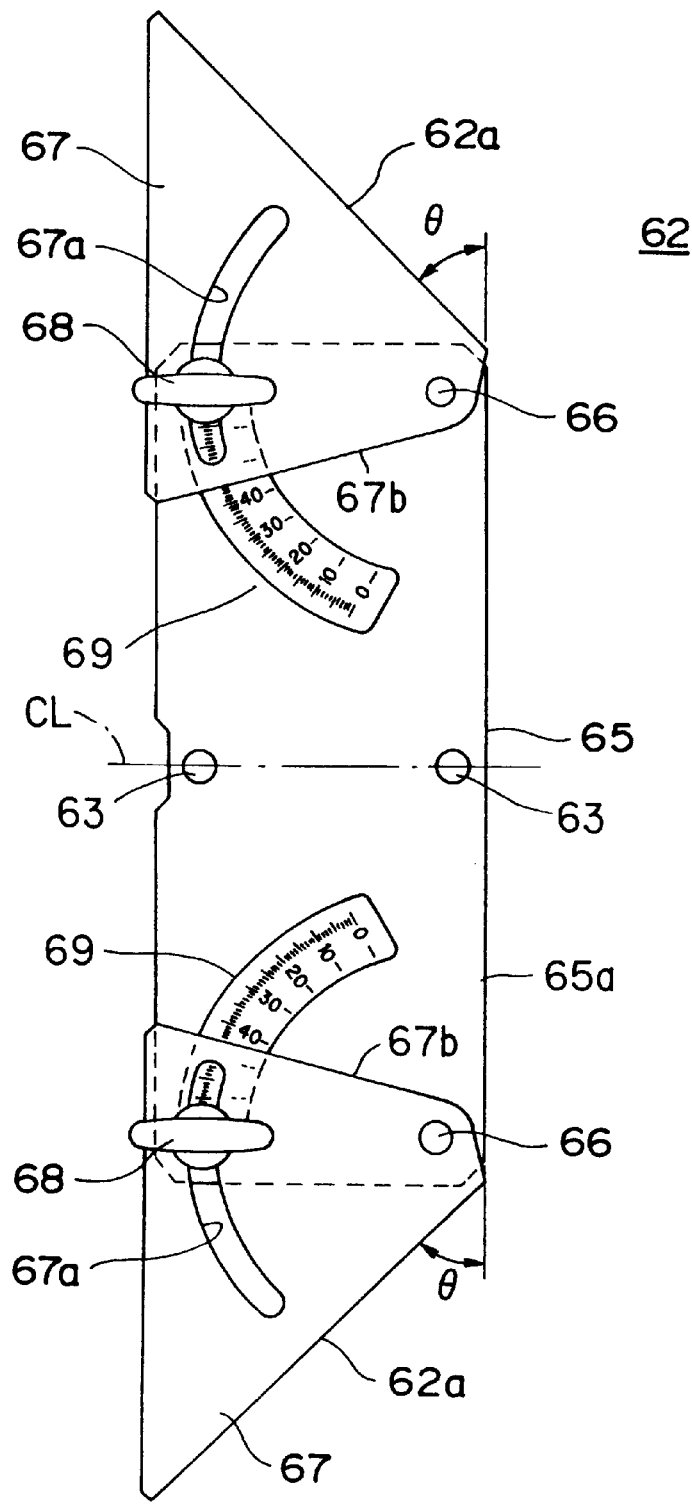
FIG. 8 is a plane view of a gauge plate which can be attached to the cutting apparatus as shown in FIG. 1.

Referring to FIG. 8, the set gauge 62 has a rectangular flat plate 65 and a pair of movable plates 67, 67, each of which is swingably connected to the end portion of the guide plate 65 through a pivot pin 66. The guide plate 65 is provided on its center line CL with guide pins 63, 63 to be inserted into the groove 7f of the horizontal base 7. Therefore, it is possible to put the guide plate 65 symmetrically to a plane P (refer to FIG. 2) which extends along the groove 7f and which is perpendicular to both the mount surface 7a and the abutment surface 5c. The plane P contains the axis of the cutter shaft 21 when the circular saw blade B is laid horizontally. Each movable plate 67 is formed with a positioning surface 62a with which an abutment surface 9b of the angle ruler 9 (refer to FIG. 2) is brought into contact.

The movable plate 67 is formed with an elongated hole 67a curving with the pivot pin 66 being the center of curvature. The movable plate 67 can be fixed on the guide plate 65 by fastening a wing bolt 68 screwed into the guide plate 65 through the elongated hole 67a. When the wing bolt 68 is unfastened, it is possible to swing the movable plate 67 with the pivot pin 66 as a fulcrum to change an angle θ of the positioning surface 62a with respect to the edge 65a of the guide plate 65 perpendicular to the center line CL. The guide plate 65 is provided with scales 69, 69 to indicate the angles θ in combination with edges 67b, 67b of the movable plates 67, 67. The angle θ is set at a value equal to an angle φ of a tip of the work W (refer to FIG. 2).

According to the above set gauge 62, it is possible to set the abutment surface 9b of the angle ruler 9 at a correct angle in accordance with the angle φ of the work W by the steps of adjusting the angle θ of the movable plate 67, mounting the guide plate 65 on the horizontal base 7 by inserting the guide pins 63, 63 into the groove 7f, pressing the abutment surface 9b of the angle ruler 9 against the positioning surface 62a, and fixing the angle ruler 9 by tightening the bolt 12. Also, it is not necessary to prepare a plurality of set gauges in accordance with a plurality of works W having different angles φ.

After finishing the above steps, the set gauge 62 is detached from the horizontal plate 7 to mount the work W thereon. It may be possible to mount the angle rulers 9, 9 and the set gauges 62 on an additional plate (not shown in the figures) separately attached onto the mount surface 7*a* of the horizontal plate 7.

Figure 9:
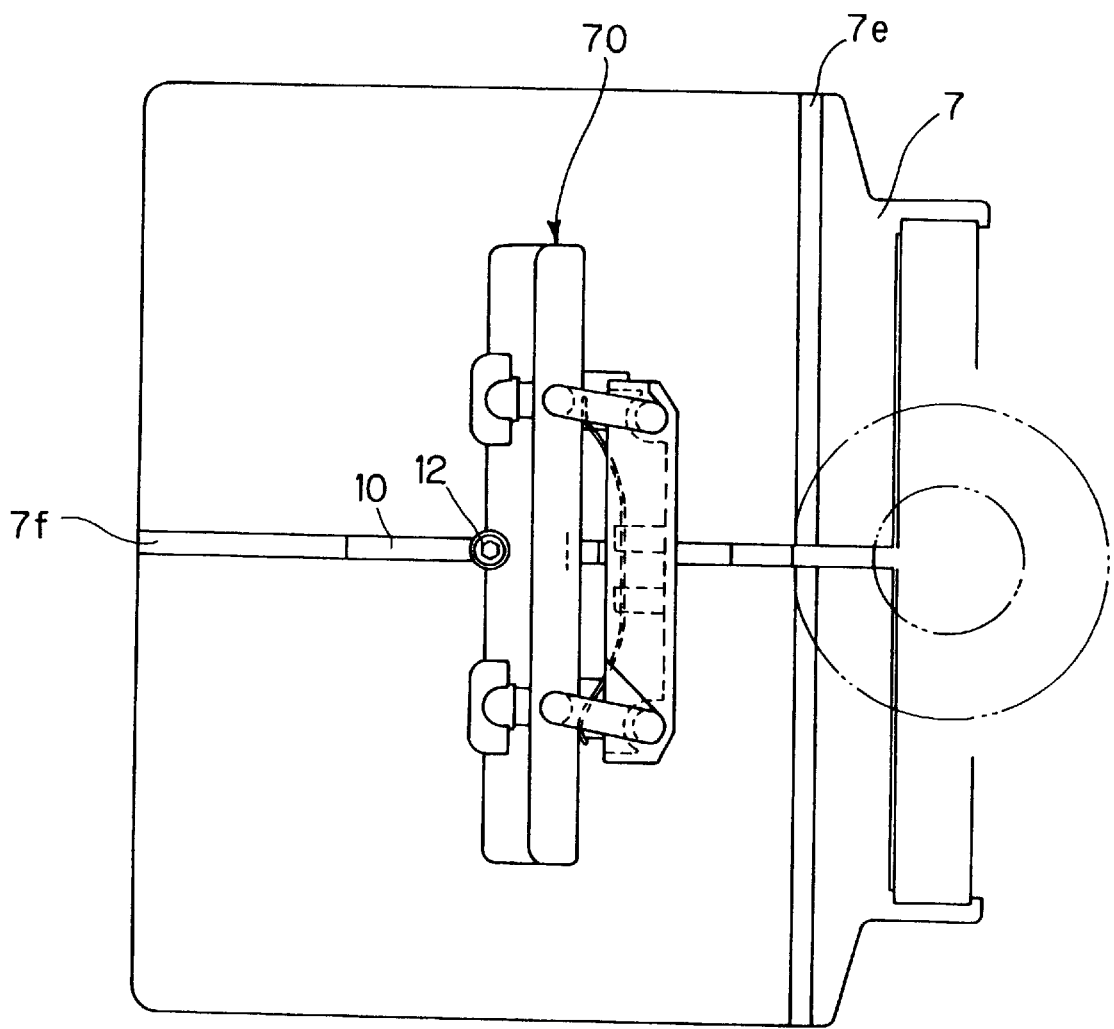
FIG. 9 is a partial plan view of the cutting apparatus of FIG. 1 with a kickback prevention device.

FIG. 9 shows an arrangement in which a kickback prevention device 70 is mounted on the horizontal base 7 instead of the angle rulers 9, 9. The device 70 is mounted on the horizontal base 7 by using the guide 10, the rectangular nut 11 and the bolt 12 with respect to the groove 7*f* similar to the case of the angle ruler 9.

Figure 10:
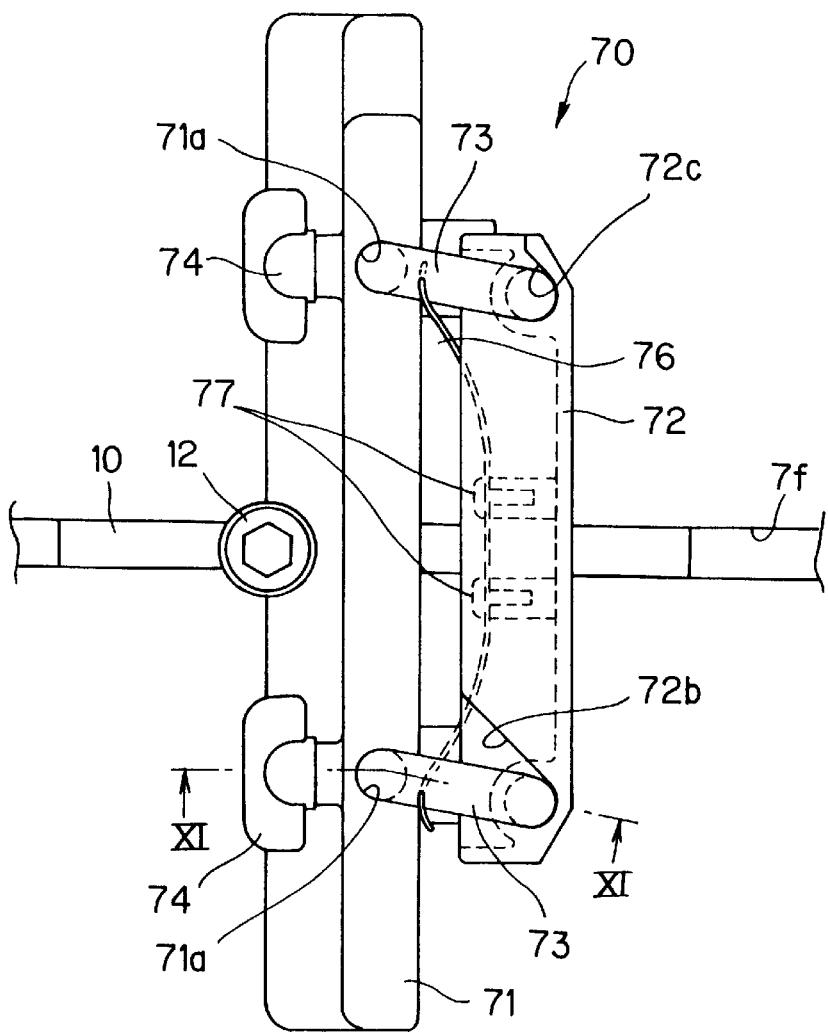
FIG. 10 is a detailed plan view of the kickback preventing apparatus as shown in FIG. 9.
Figure 11:
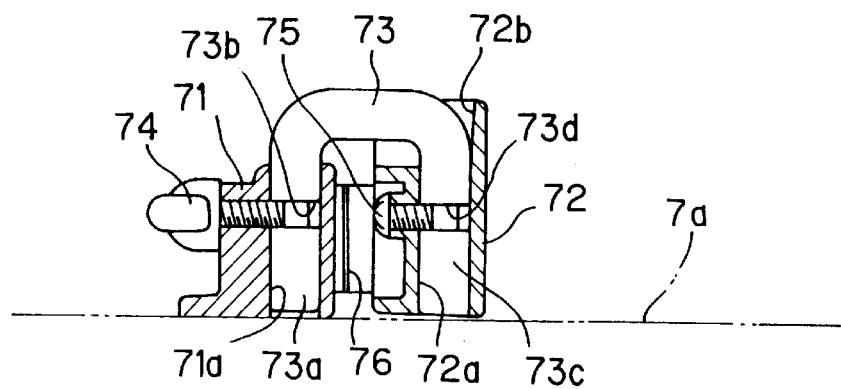
FIG. 11 is a sectional view of the kickback prevention device along the line XI—XI in FIG. 10.

As shown in FIGS. 10 and 11, the device 70 has a ruler 71 as a main body, a press member 72 adjacent to the ruler 71 and a pair of link members 73, 73 connecting the press member 72 and the ruler 71 with each other. Each link member 73 has an inverted U-shape. One end portion 73*a* of the link member 73 is pivotally inserted into an attachment hole 71*a* of the ruler 71, and a groove 73*b* of the link member 73 is engaged with a wing bolt 74 to prevent the link member 73 from pulling out from the hole 71*a*. The other end 73*c* of the link member 73 is pivotally inserted into an attachment hole 72*a*, and a groove 73*d* of the link member 73 is engaged with a screw 75 to prevent the link member 73 from pulling out from the hole 72*a*.

The press member 72 is formed with recess portions 72*a* and 72*b* to restrict the range of movement of the press member 72 with respect to the ruler 71. For example, if the press member 72 is moved downwardly in FIG. 10, it is possible to bring the press member 72 into contact with the ruler 71. However, if the press member 72 is moved upwardly in FIG. 10, the link members 73, 73 engage with the walls of the recess portions 72*b*, 72*c* at positions illustrated in FIG. 10 to thereby restrict further movement of the press member 72. Each of the recess portions 72*b*, 72*c* is preferably formed in a shape by which the swing angle of the link member 72 around the attachment hole 72*a* is set within a range of 5° through 45°.

On a surface of the press member 72 facing the ruler 71 is fixed a plate spring 76 by using screws 77, 77. Both end portions of the plate spring 76 are elastically deformed as they are pressed against the ruler 31, and the press member 72 is urged toward the vertical wall portion 5*b* (the right-hand side of FIG. 10) by the restoring force of the plate spring 76. Therefore, the press member 72 is kept at a position illustrated in FIG. 10.

According to the above device 70, it is possible to clamp the work W between the press member 72 and the horizontal base 7 to prevent the kickback of the work W. For example, when forming the biscuit groove on the work W, it is possible to hold the work W securely by pressing the surface Wa of the work W against the abutment surface 5*c* of the vertical base 5 and then pressing the press member 72 against the work W by moving the ruler 71 toward the work W. An elongated groove can be formed on the work W by setting a space between the press member 72 and the abutment surface 5*c* of the vertical base 5 at a value less than the width of the work W, and inserting the work W into the space between the press member 72 and the vertical base 5 from the upper side of FIG. 10 toward the lower side thereof.

FIGS. 12 to 15 show a cutting apparatus A2 as the second embodiment of the present invention. In the following explanation, the lateral direction of FIG. 12 corresponds to the cross direction of the apparatus A2, the vertical direction of FIG. 12 corresponds to the lateral direction of the apparatus A2, and the vertical direction of FIG. 2 corresponds to the vertical direction of the apparatus A2. The left hand side of FIG. 12 corresponds to the front side of the apparatus A2.

As shown in these figures, the apparatus A2 of this embodiment comprises a table 101 as a first base portion on which a mount surface 101*a* is provided. At the rear portion of the table 101 is provided a pair of guide bars 102, 102, as second guide members extending in a direction perpendicular to the mount surface 101*a*, and an elevation holder 103 as a second base portion is fitted on the guide bars 102, 102 so as to be movable in the vertical direction. The elevation holder 103 is provided with an abutment surface 103*a* perpendicular to the mount surface 101*a*. The work W made of wood or the like is pressed against the abutment surface 103*a* with being supported on the mount surface 101*a*.

Figure 13:
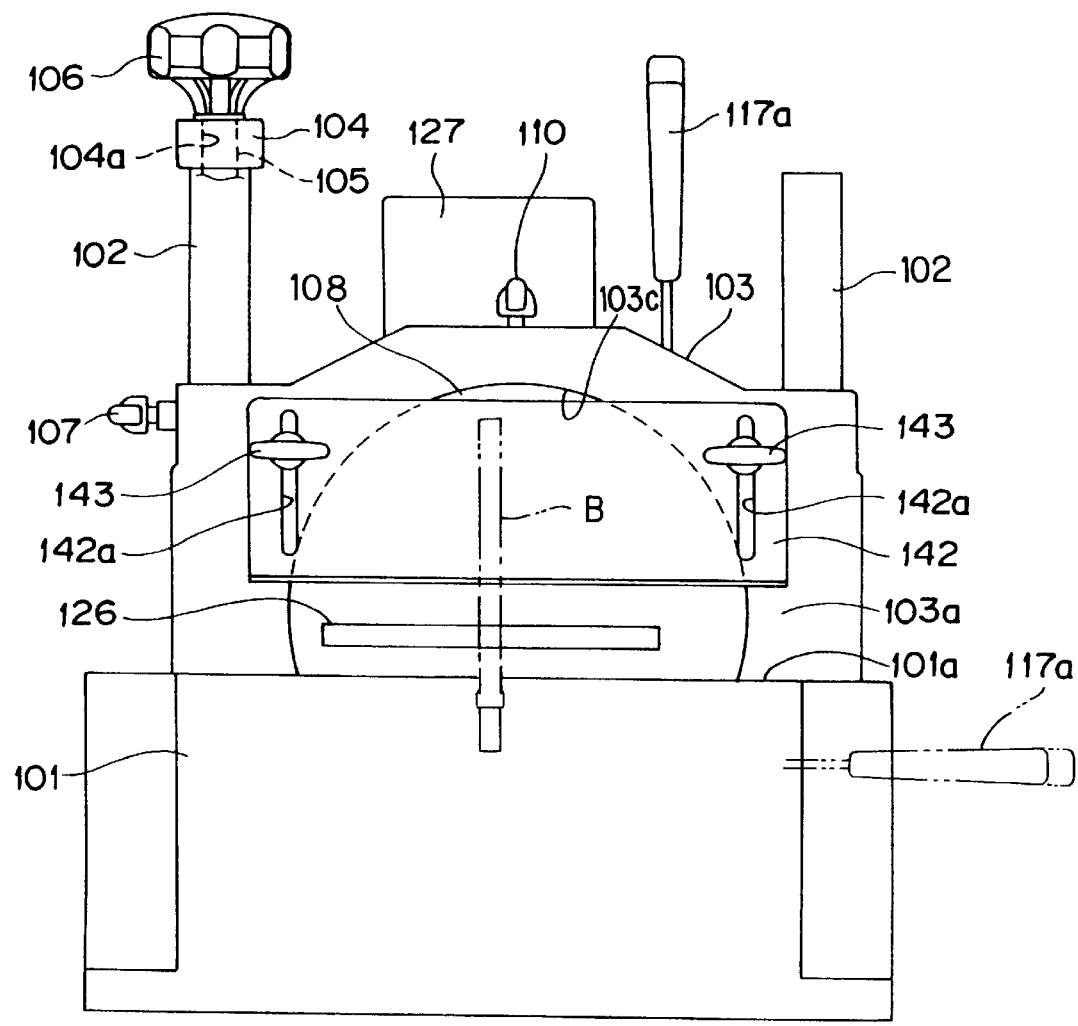
FIG. 13 is a front view of the cutting apparatus as shown in FIG. 12.
Figure 14:
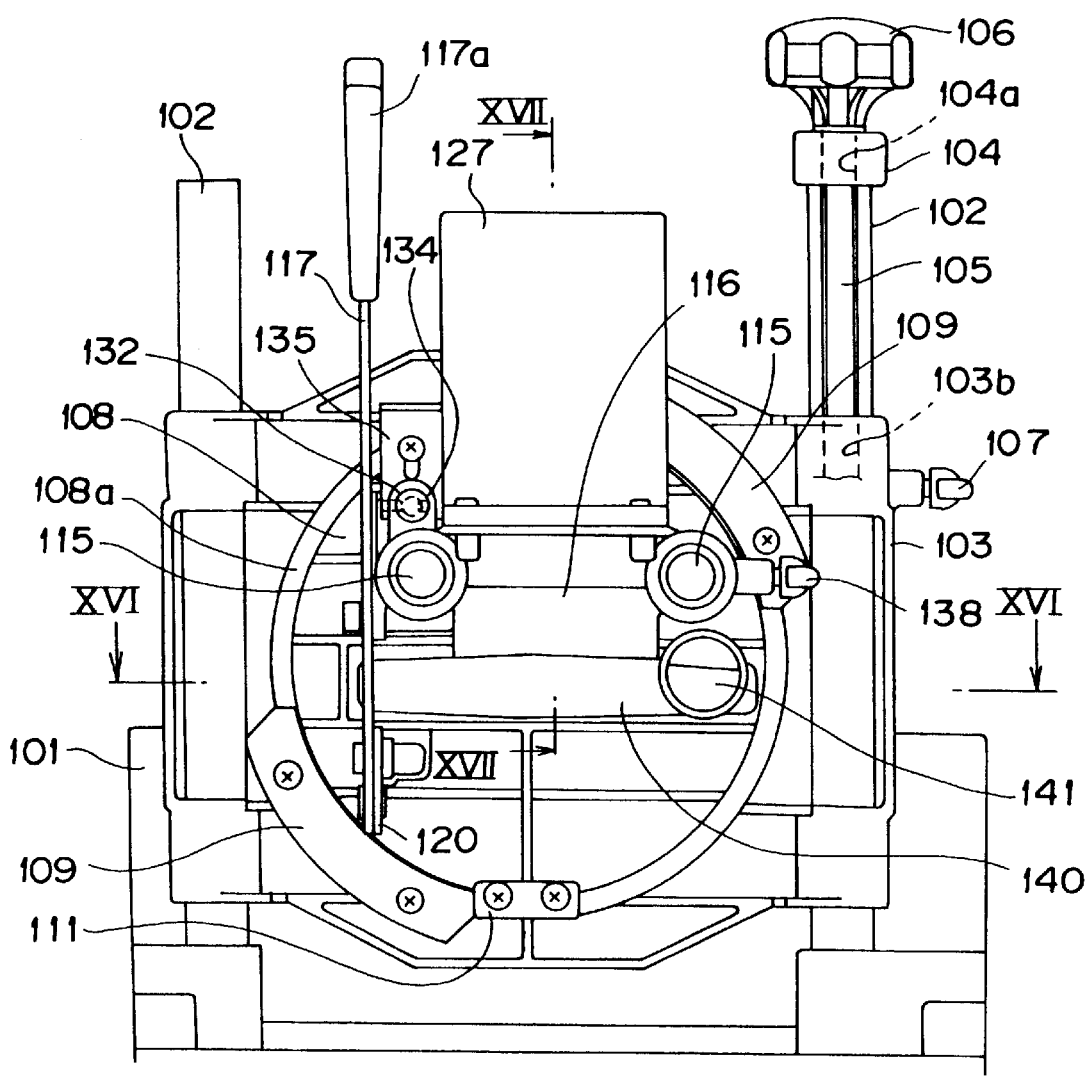
FIG. 14 is a rear view of the cutting apparatus as shown in FIG. 12.

As shown in FIGS. 13 and 14, a screw holder 104 is attached to the upper end portion of one of the guide bars 102, 102, and a screw shaft 105 parallel to the guide bar 102 is fitted into a through hole 104*a* of the holder 104 so as to be freely rotatable. The screw shaft 105 is provided at its upper end portion with an elevation handle 106, and the lower portion of the screw shaft 102 is screwed into a threaded recess 103*b* of the elevation holder 103 (refer to FIG. 14). When the screw shaft 105 is rotated in accordance with the operation of the elevation handle 106 by the operator, the elevation holder 103 engaged with the screw shaft 105 is moved up and down while being guided by the guide bars 102, 102. The elevation holder 103 is formed with a side surface portion into which a wing bolt 107 is screwed. A tip portion of the wing bolt 107 engages with the outer circumference of the guide bar 102 as the wing bolt 107 is tightened, thereby the up and down movement of the elevation holder 103 is prevented. The elevation holder 103 can be moved up and down when the wing bolt 107 is loosened.

Figure 16:
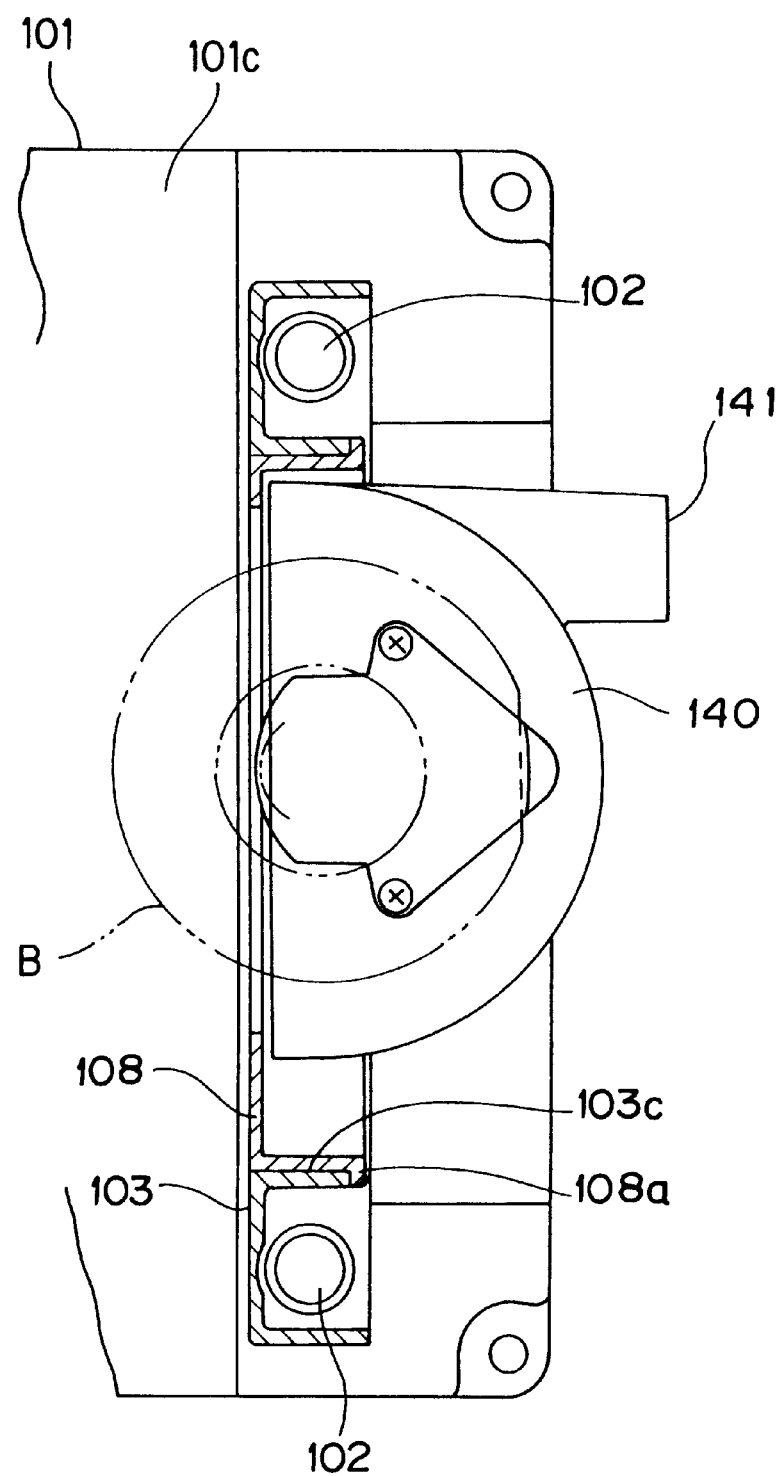
FIG. 16 is a sectional view of the cutting apparatus along the line XVI—XVI in FIG. 14.

As shown in FIGS. 13, 14 and 16, the elevation holder 103 is provided with a table mount hole 103*c*, an axis of which extends in the cross direction of the apparatus A2. A turn table 108 is provided in the table mount hole 103*c* so as to be freely turnable. The turn table 108 is provided with a flange 108*a* at its outer circumference in the rear side thereof. The flange 108*a* engages with a pair of holder plates 109, 109, each of which is attached to the rear side of the elevation holder 103, and thus the turn table 108 is held in the holder 103 without dropping off. The front surface of the turn table 108 is coplanar with the front surface of the elevation holder 103 to thereby constitute a part of the abutment surface 103*a*.

Figure 12:
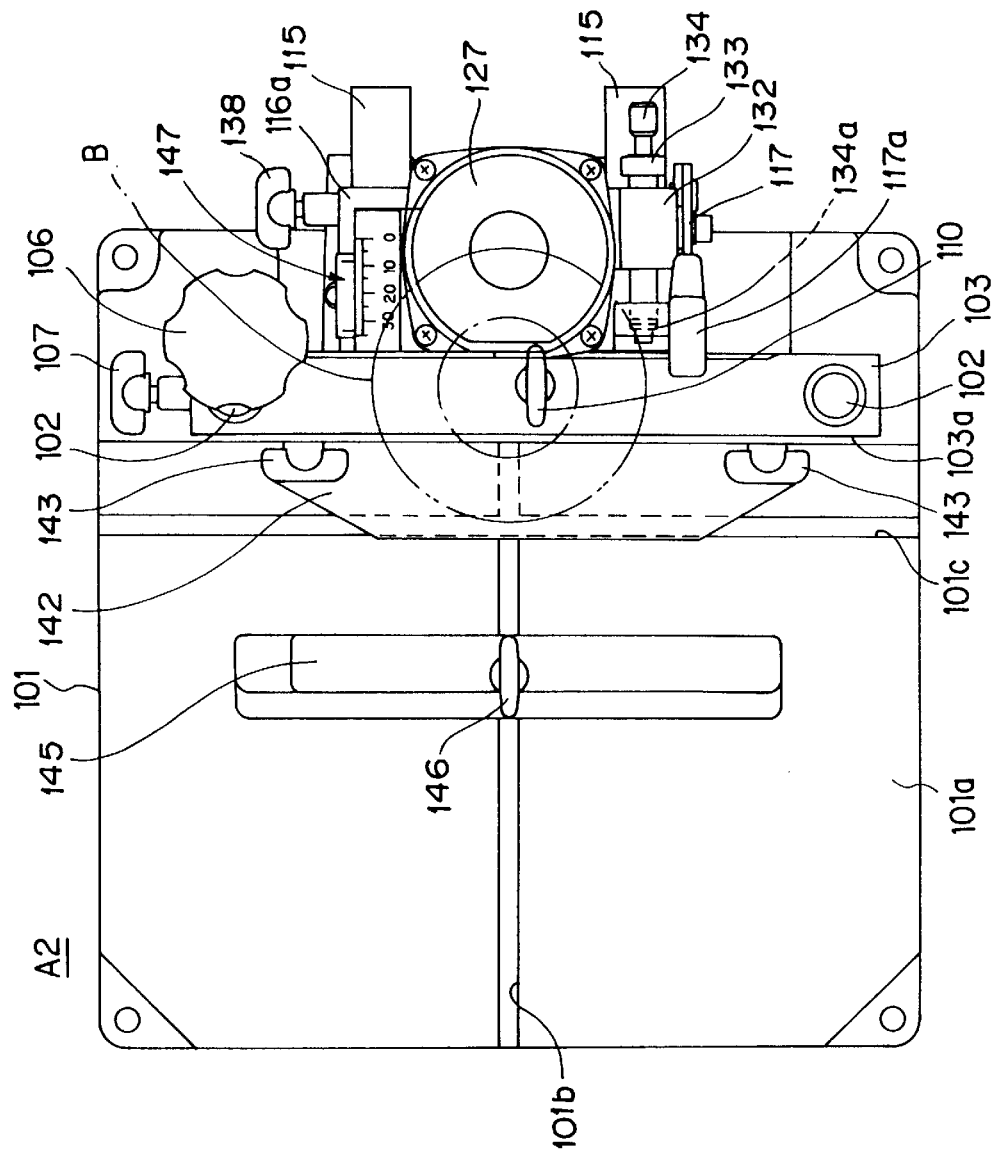
FIG. 12 is a plan view illustrating another cutting apparatus to which the present invention is applied.

As shown in FIGS. 12 and 13, the elevation holder 103 is provided with an upper portion into which a wing bolt 110 is screwed. A tip portion of the wing bolt 110 engages with the outer circumference of the turn table 108 as the wing bolt 110 is tightened to thereby prevent the turning of the turn table 108. The turn table 108 can be turned when the wing bolt 110 is loosened. As shown in FIG. 14, an angle stopper 111 is attached to the flange 108*a* of the turn table 108. The angle stopper 111 contacts the holder plates 109, 109 as it turns to a predetermined position to thereby prevent the further turning of the turn table 108. The turning angle of the turn table 108 is restricted to 90° by both of the holder plates 109, 109. It may be possible to restrict the turning angle to a value other than 90°.

Figure 15:
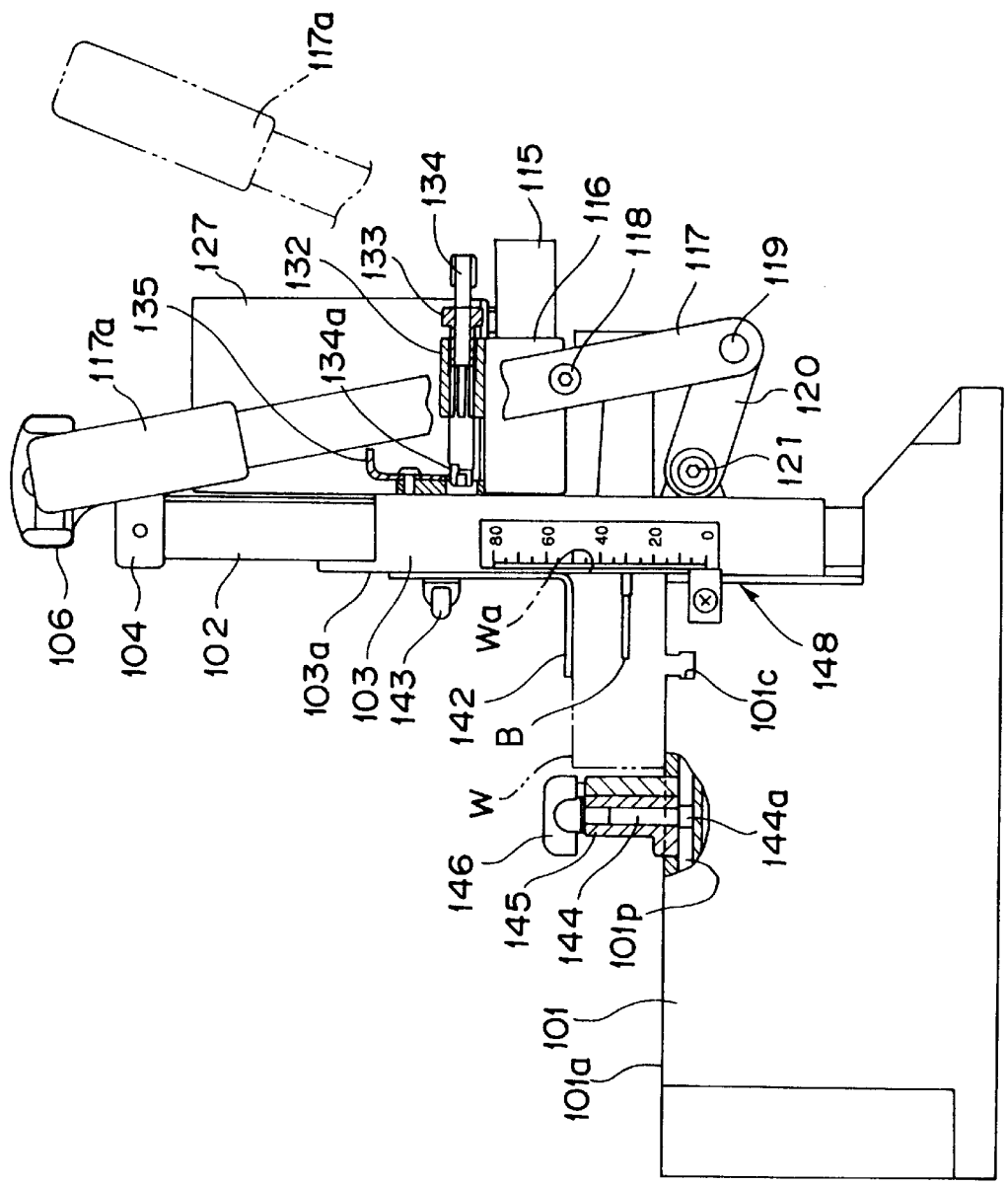
FIG. 15 is a side view of the cutting apparatus as shown in FIG. 12.

The turn table 108 is provided at its rear side portion with a pair of guide bars 115, 115 as first guide members extending in the cross direction of the apparatus A2. On the guide bars 115, 115 is mounted a slide base 116 so as to be slidable in an axial direction (the cross direction). As shown in FIG. 15, a cutting lever 117 is swingably connected with the slide base 116 through a pivot screw 118. The cutting lever 117 is pivotally connected at its lower end portion with one end of a link 120 through a rivet 119, and the other end of the link 120 is pivotally connected with the rear side portion of the elevation holder 103 through a pivot screw 121. As the lever 117 is operated in the cross direction of the apparatus A2 by an operator grasping a grip portion 117a provided at the upper end of the cutting lever 117, the slide base 116 moves in the cross direction of the apparatus A2 with being guided by the guide bars 115, 115.

Figure 17:
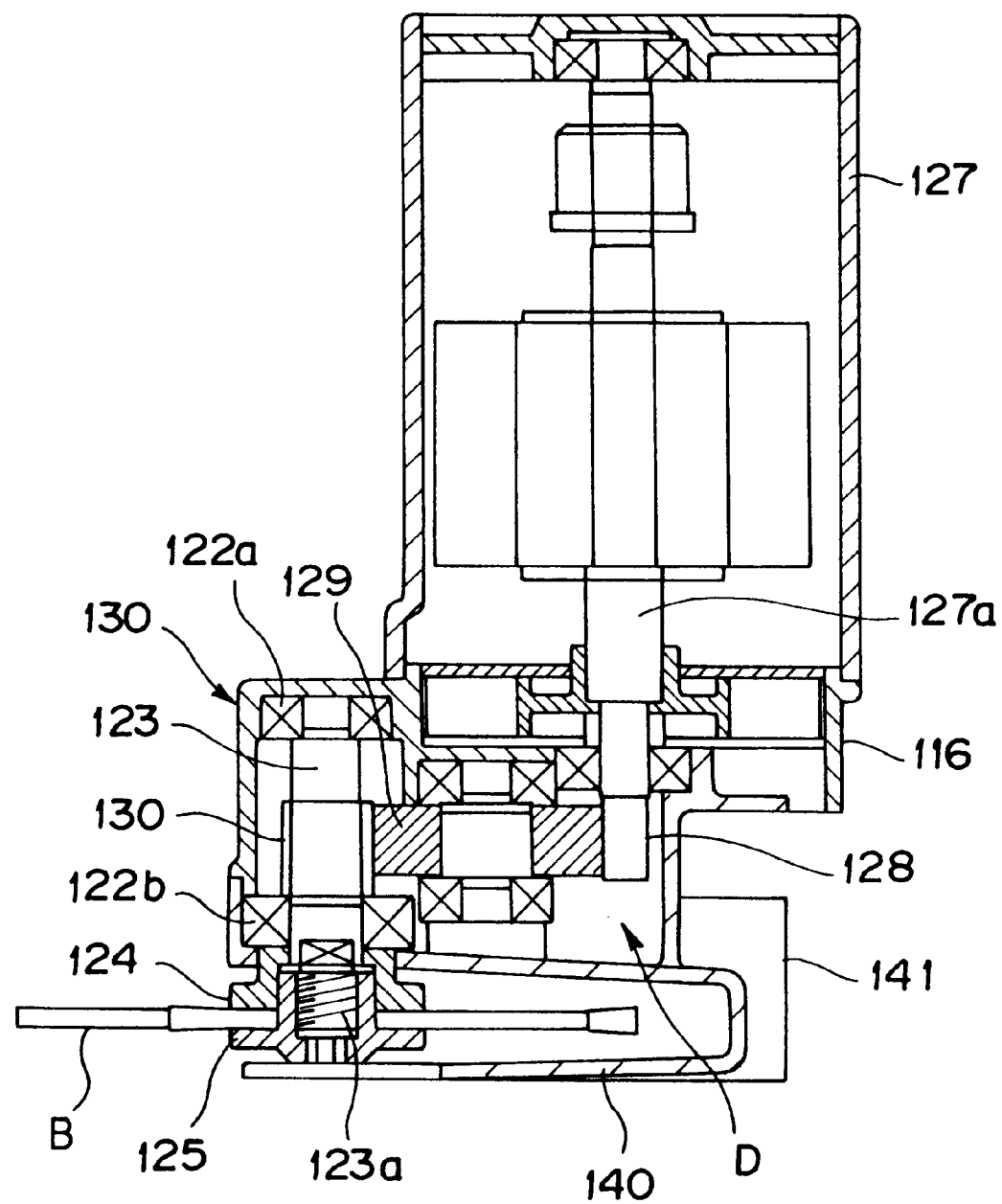
FIG. 17 is a sectional view of the cutting apparatus along the line XVII—XVII in FIG. 14.

As shown in FIG. 17, a cutter shaft 123 is mounted in the slide base 116 through bearings 122a, 122b so as to be rotatable about its axis. The cutter shaft 123 is provided, at its lower end portion, with a fixed clamp member 124 capable of rotating together with the cutter shaft 123. Also, a male screw portion 123a is provided at the lower end of the cutter shaft 123, and a movable clamp member 125 is screwed onto the male screw portion 123a. The circular saw blade B can be held between both clamp members 124, 125 by the steps of detaching the movable clamp member 125 from the male screw portion 123a, attaching the circular saw blade B to the lower surface side of the fixed clamp member 124, and screwing the movable clamp member 125 onto the male screw portion 123a.

The slide base 126 is provided at its rear portion with a motor 127. The rotation of an output shaft 127a of the motor 127 is transmitted to a gear 130 integrally formed with the cutter shaft 123 through a drive gear 128 integral with the output shaft 127a and an intermediate gear 129. Accordingly, it is possible to drive the circular saw blade B in accordance with the rotation of the cutter shaft 123 by activating the motor 127. Under this condition, the circular saw blade B projects from the abutment surface 103a of the elevation base 103 to be cut into the work W when the cutting lever 117 is operated from an off-position illustrated by imaginary lines in FIG. 15 to an on-position illustrated by solid lines therein to move the slide base 116 toward the front of the apparatus A2. When the cutting lever 117 is operated to the off-position, the circular saw blade B is withdrawn from the abutment surface 103a toward the rear of the apparatus A2.

As shown in FIG. 15, the slide base 116 is provided at its upper portion with a screw holder 132 on which an adjusting nut 133 is screwed. In a center portion of the adjusting nut 133, a cutting stopper 134 is provided so as to be swingable with its axis as a center and not to be movable in the axial direction thereof with respect to the adjust nut 133. As the slide base 116 moves toward the elevation holder 103, a tip portion 134a of the stopper 134 abuts a lock plate 135 attached to the rear side of the turn table 108 to prevent further forward movement of the slide base 116. The stopper 134 moves forward and rearward as the adjusting nut 133 is turned. In accordance with this movement, the projecting amount of the circular saw blade B from the abutment surface 103a of the elevation holder 103 is changed, and thus the depth of cut by the circular saw blade B with respect to the work W is also changed.

At a tip portion 134a of the cutting stopper 134, three notches (not shown in the figures) are formed so as to be arranged along the circumferential direction of the cutting stopper 134 at a pitch of 120°, and each notch has a length different from that of the other notch in the axial direction of the cutting stopper 134. One of the notches is located so as to confront the lock plate 135 in accordance with the turning of the cutting stopper 134 with respect to the adjusting nut 133. The confronted notch can engage with the lock plate 135 as the slide base 116 moves forward to thereby restrict the further forward movement of the slide base 116. Accordingly, it is possible to carry out step by step adjustments of the depth of cut by the circular saw blade B by turning the cutting stopper 134.

As shown in FIGS. 12 and 14, one of cylindrical portions 116a, 116a of the slide base 116 fitted to the guide bars 115 is provided with a wing bolt 138. A tip portion of the wing bolt 138 is pressed against an outer circumference of the guide bar 115 as the bolt 138 is tightened to thereby prevent movement of the slide base 116. The slide base 116 can be moved when the wing bolt 138 is loosened.

As shown in FIGS. 14, 16 and 17, the slide base 116 is provided at its lower portion with a cutter cover 140 partially housing the circular saw blade B, and the rear end thereof is formed with an outlet 141 to discharge chips or the like. The outlet 141 is connected with a hose or a bag or the like for collecting dust.

As shown in FIGS. 12 to 14, a guard 142 to prevent the operator from contacting the circular saw blade B is attached to the abutment surface 103a of the elevation base 103 by using wing bolts 143,143. Each wing bolt 143 is screwed into the elevation base 103 through elongated guide holes 142a, 142a extending in the vertical direction. Accordingly, the position of the guard 142 in the vertical direction can be adjusted in accordance with the height of the work W.

As shown in FIGS. 12 and 15, the table 101 is formed with grooves 101b, 101c which open to the mount surface 101a and which extend in the cross and the lateral directions, respectively. A head portion 144a of a hexagon bolt 144 can be inserted into each of the grooves 101b, 101c. The bolt 144 is screwed into a wing nut 146 through a ruler 145 mounted on the mount surface 101a. The ruler 145 can be moved along the mount surface 101a by loosening the wing nut 146, and the ruler 145 can be fixed at a desired position by tightening the wing nut 146.

A method of cutting with the above apparatus A2 is as follows. First, the work W is mounted on the mount surface 101a, and the surface Wa thereof is pressed against the abutment surface 103a. At this time, the ruler 145 is pressed against the work W to locate it, if necessary. Under this condition, the cutting handle 117 is operated to project the circular saw blade B from the abutment surface 103a with the circular saw blade B being rotated by the motor 127. Therefore, a semicircular biscuit groove is formed on the work W.

When an elongated groove is formed on the work W, the wing nut 138 is tightened to fix the slide base 116 with the circular saw blade B extending beyond the abutment surface 103a, and the work W is moved in the lateral direction of the apparatus A2 with being guided between the abutment surface 103a and the ruler 145 in combination with the rotation of the circular saw blade B.

During the above cutting operation, it is possible to adjust the cut position of the biscuit groove or the like in the vertical direction by operating the elevation handle 106 to move the elevation holder 103 up and down. When the turn table 108 is turned to tilt the axis of the circular saw blade B at a desired angle with respect to the vertical direction, it is possible to cut a biscuit groove extending in a direction not parallel to the mount surface 101a. The circular saw blade B can be turned to a position parallel to the mount surface 101a as shown in FIG. 13 with imaginary lines. In this case, it is possible to form a biscuit groove extending in the vertical direction on the work W.

As shown in FIGS. 12 and 15, the elevation holder 103 and the slide base 116 are provided with gauges 147, 148 to indicate the position of the circular saw blade B or the amount of the movement thereof in the vertical and the cross directions, respectively.

In this embodiment, it may be possible to mount various attachments on the mount surface 101a similar to the first embodiment. The cutter B may be moved in the cross direction by an actuator, such as a motor or the like.

In the present invention, the work W is not restricted to that made of wood, the apparatus can cut other materials similar to wood, such as resin material.

I claim:

1. A cutting apparatus for cutting a work, such as wood, comprising:
   a first base portion having a mount surface on which the work is mounted;
   a second base portion having an abutment surface with which a work surface to be worked is brought into contact; and
   a cutter holding portion capable of holding a circular saw blade so as to extend beyond the abutment surface toward the work, the cutter holding portion being turnable, with respect to the second base portion, around an axis perpendicular to the abutment surface.

2. The cutting apparatus according to claim 1, wherein the cutter holding portion is turnable between a vertical position at which the circular saw blade is held vertically and a horizontal position at which the circular saw blade is held horizontally.

3. The cutting apparatus according to claim 1, further comprising a guide member extending in a direction perpendicular to the abutment surface, the second base portion being mounted on the guide member so as to be slidable along the guide member.

4. The cutting apparatus according to claim 3, further comprising a support frame coupled with the guide member, the cutter holding portion having a turn table mounted on the support frame so as to be turnable around the axis perpendicular to the abutment surface.

5. The cutting apparatus according to claim 4, further comprising a fixing device for preventing slide movement of the second base portion with respect to the guide member.

6. The cutting apparatus according to claim 3, wherein the first base portion is coupled with the second base portion so as to be movable in a direction parallel to the abutment surface.

7. The cutting apparatus according to claim 1, wherein the cutter holding portion has a turn table mounted on the second base portion so as to be turnable around the axis perpendicular to the abutment surface.

8. The cutting apparatus according to claim 7, wherein the turn table is provided with a first guide member extending in a direction perpendicular to the abutment surface, and the cutter holding portion has a slide base mounted on the first base member so as to be slidable along the first guide member.

9. The cutting apparatus according to claim 8, further comprising a fixing device for preventing movement of the slide base with respect to the first guide member.

10. The cutting apparatus according to claim 7, further comprising a second guide member extending in a direction parallel to the abutment surface, the second base portion being mounted on the second guide member so as to be slidable along the second guide member.

11. The cutting apparatus according to claim 1, wherein a pair of rulers are mounted on the mount surface of the first base portion so as to be movable on the mount surface to adjust position and angle relative to the abutment surface.

12. The cutting apparatus according to claim 11, wherein a set gauge for locating the pair of rulers symmetrically to a plane parallel to a direction along which the circular saw blade cuts the work is mounted on the mount surface of the first base portion.

13. The cutting apparatus according to claim 1, further comprising a kickback prevention device having a main body mounted on the mount surface of the first base portion, a press member provided between the main body and the mount surface, at least two link members, each of which is pivotally connected with both the main body and the press member to regulate movement of the press member with respect to the main body, and an urging member for urging the press member toward the second base portion.

14. A cutting apparatus for cutting a work, such as wood, comprising:
    a cutter holding portion for holding a circular saw blade;
    a frame holding the cutter holding portion;
    a guide member attached to the frame; and
    a work holding device capable of holding the work and being movable along the guide member in a direction toward or away from the circular saw blade.

15. A cutting apparatus for cutting a work, such as wood, comprising:
    a first base portion on which the work is mounted;
    a second base portion having an abutment surface with which a work surface to be worked is brought into contact;
    a base operating device capable of moving the second base portion along a direction parallel to the abutment surface;
    a cutter holding portion supported by the second base portion and holding a circular saw blade so as to extend beyond the abutment surface toward the work; and
    a cutter driving device for rotating the circular saw blade about an axis thereof.

* * * * *